(12) United States Patent
Martin et al.

(10) Patent No.: US 12,117,827 B2
(45) Date of Patent: Oct. 15, 2024

(54) REMOTE CONTROLLED ENGINE REVVING

(71) Applicant: Ford Global Technologies, LLC, Dearborn, MI (US)

(72) Inventors: Douglas Martin, Canton, MI (US); Shane Zimmer, Royal Oak, MI (US); John Rollinger, Troy, MI (US); Vincent Martinez, Dearborn, MI (US); Scott Thompson, Belleville, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 0 days.

(21) Appl. No.: 18/315,373

(22) Filed: May 10, 2023

(65) Prior Publication Data

US 2023/0280744 A1 Sep. 7, 2023

Related U.S. Application Data

(62) Division of application No. 17/088,465, filed on Nov. 3, 2020, now Pat. No. 11,733,691.

(51) Int. Cl.
| | | |
|---|---|---|
| *G05D 1/00* | (2024.01) | |
| *B60Q 1/50* | (2006.01) | |
| *B60R 16/023* | (2006.01) | |
| *F01N 1/16* | (2006.01) | |
| *F02D 41/06* | (2006.01) | |
| *F02D 41/08* | (2006.01) | |
| *F02N 11/08* | (2006.01) | |
| *G06F 3/16* | (2006.01) | |

(52) U.S. Cl.
CPC ............. *G05D 1/0016* (2013.01); *B60Q 1/50* (2013.01); *B60R 16/0231* (2013.01); *F01N 1/16* (2013.01); *F02D 41/062* (2013.01); *F02D 41/08* (2013.01); *F02N 11/0807* (2013.01); *F02N 11/0811* (2013.01); *G06F 3/165* (2013.01)

(58) Field of Classification Search
CPC ......... G05D 1/0016; F01N 1/16; F01N 1/166; F01N 1/168; F01N 1/18; F01N 2240/36; F01N 2900/04; F01N 2900/10; F02D 41/062; F02D 41/08
See application file for complete search history.

(56) References Cited

U.S. PATENT DOCUMENTS

| | | | |
|---|---|---|---|
| 4,469,064 | A | 9/1984 | Manaka et al. |
| 4,606,307 | A | 8/1986 | Cook |
| 5,129,376 | A | 7/1992 | Parmley |
| 6,701,896 | B2 | 3/2004 | Kiessling |
| 6,721,648 | B2 | 4/2004 | Masters et al. |
| 8,280,608 | B2 | 10/2012 | Senda et al. |
| 9,784,229 | B2 | 10/2017 | Holub et al. |
| 10,586,254 | B2 | 3/2020 | Singhal |
| 11,441,499 | B1 * | 9/2022 | Dadam ..................... F01N 9/00 |
| 2002/0177940 | A1 | 11/2002 | Suzuki et al. |
| 2014/0288736 | A1 | 9/2014 | Martin et al. |

(Continued)

*Primary Examiner* — John Kwon
(74) *Attorney, Agent, or Firm* — Vincent Mastrogiacomo; McCoy Russell LLP

(57) ABSTRACT

Methods and systems are provided for user controlled engine revving. In one example, the engine may be revved to a peak speed according to a target revving sequence in response to a user-initiated command. A revving sound may be provided in response to an input device, without demanding manual depression of an accelerator pedal.

8 Claims, 7 Drawing Sheets

(56) References Cited

U.S. PATENT DOCUMENTS

| | | |
|---|---|---|
| 2019/0285017 A1* | 9/2019 | Dudar .................. F02D 41/064 |
| 2021/0071555 A1* | 3/2021 | Dadam .................... F01N 1/16 |
| 2022/0137616 A1* | 5/2022 | Martin .................... G06F 3/165 |
| | | 701/2 |
| 2023/0070435 A1 | 3/2023 | Thompson et al. |

* cited by examiner

REMOTE CONTROLLED ENGINE REVVING

CROSS REFERENCE TO RELATED APPLICATION

The present application is a continuation/divisional/continuation-in-part of U.S. Non-Provisional patent application Ser. No. 17/088,465, entitled "REMOTE CONTROLLED ENGINE REVVING", and filed on Nov. 3, 2020. The entire contents of the above-listed application are hereby incorporated by reference for all purposes.

FIELD

The present description relates generally to methods and systems for controlling a vehicle engine remotely.

BACKGROUND/SUMMARY

For car enthusiasts, various vehicles accessories may bolster a vehicle's appeal. In particular, for those who favor performance vehicles, engine sound may be a deciding factor in choosing a vehicle. For example, a tone and volume of engine sound when the engine is revved may contribute to an attractiveness of the vehicle.

Revving the engine demands manual input from a vehicle user, e.g., the user physically depresses an accelerator pedal. Thus, display of the vehicle's engine tone requires a period of time and effort for the user to turn on the engine, whether remotely or manually, enter the vehicle, and depress the accelerator pedal. However, rapid actuation of engine revving may enhance interest in a vehicle.

Furthermore, as a popularity of electric vehicles rises, including electric performance vehicles, the electric vehicles do not have an engine to provide engine revving sounds. As such, an attractiveness of the electric vehicle to a performance vehicle enthusiast may be decreased, hampering a transition to less fossil fuel-reliant vehicles.

In one example, as shown by the inventors herein, the issues described above may be at least partially addressed by a method including, in response to a user-initiated command, revving an engine of a vehicle to a peak speed, according to a target revving sequence, in response to an input device operated by the user, wherein the revving is enabled without manual depression of an accelerator pedal. In this way, the engine may be revved according to parameters selected by the user at various distances from the vehicle.

As one example, the vehicle may already be operating in an idling mode. Upon receiving the command, a motor driving engine rotation may be instructed to accelerate the engine to a selected peak speed, revving profile, and/or revving pattern. In some examples, an exhaust tuning valve may be adjusted in conjunction with engine acceleration to produce a desired engine revving sound. The command may be relayed from a remote control device or from an in-vehicle control, such as a button or user interface, to a vehicle controller and in one example, a manner in which the command is input may indicate a desired multiplicity of revving, the peak speed, noise volume, etc. In another example, instead of accelerating the engine, an engine revving sound may be emitted through a sound system of the vehicle, in response to the command. As such, the method utilizes an already existing engine or audio architecture without demanding addition of new components, allowing the revving sound to be controlled from a range of distances and at low cost.

It should be understood that the summary above is provided to introduce in simplified form a selection of concepts that are further described in the detailed description. It is not meant to identify key or essential features of the claimed subject matter, the scope of which is defined uniquely by the claims that follow the detailed description. Furthermore, the claimed subject matter is not limited to implementations that solve any disadvantages noted above or in any part of this disclosure.

DETAILED DESCRIPTION

Figure 1:
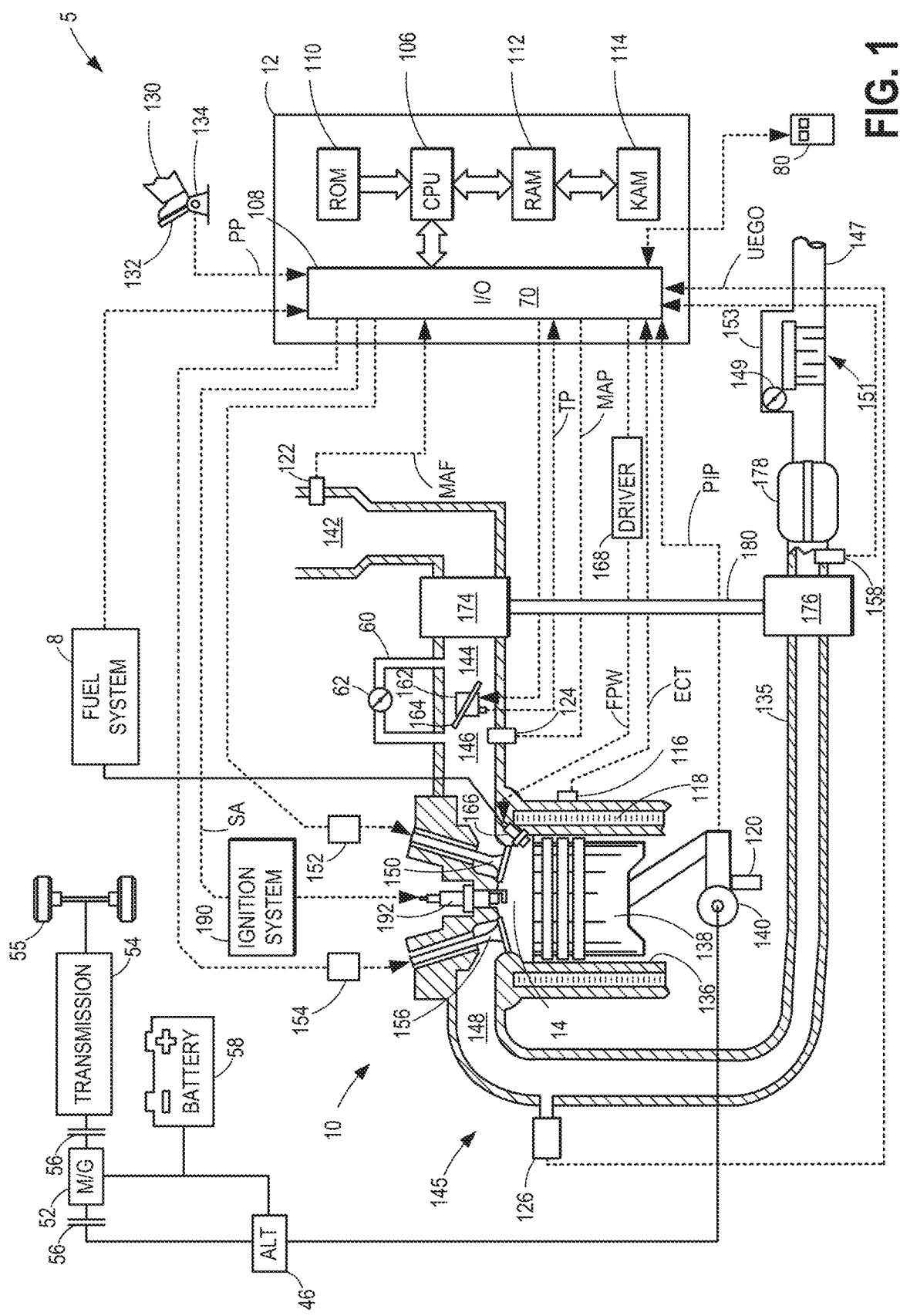
FIG. 1 shows an example of an engine system in which engine operation and speed may be remotely controlled.
Figure 2:
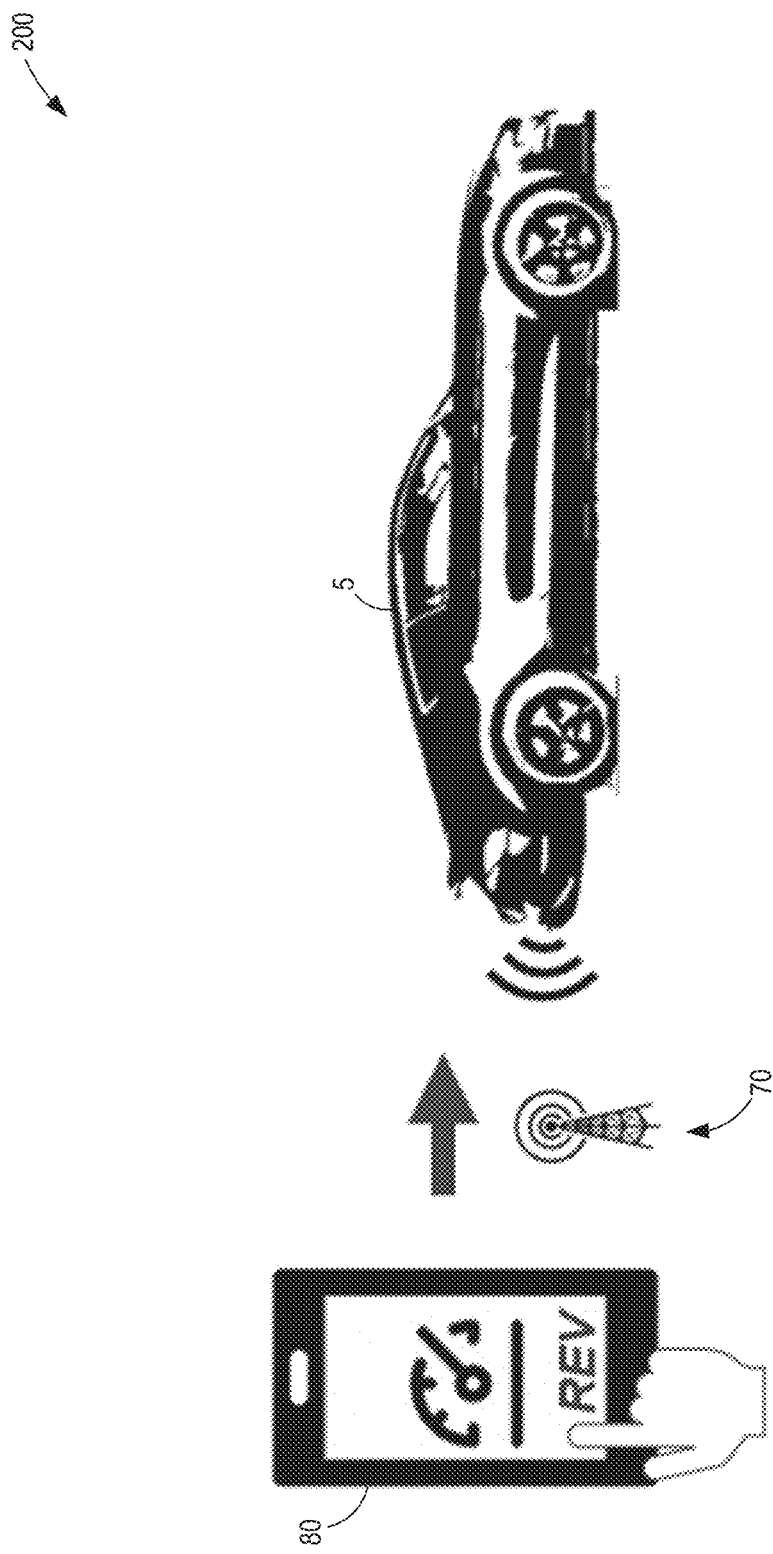
FIG. 2 shows an example of a user controlled engine revving system.
Figure 4:
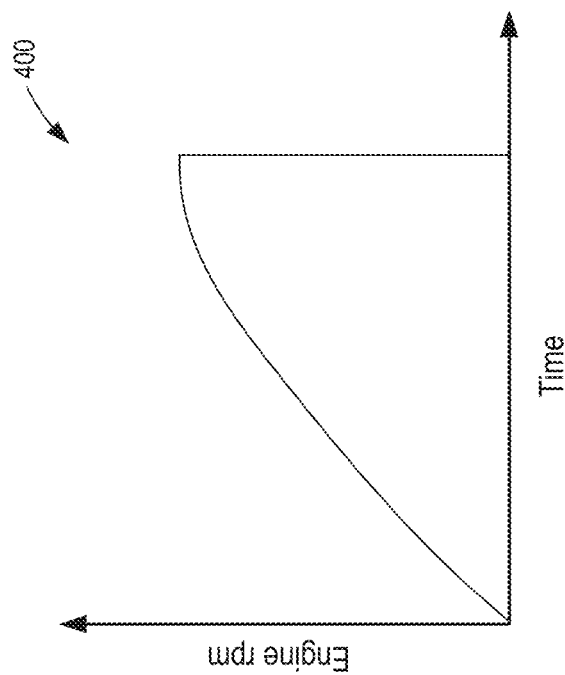
FIG. 4 shows a second example of an engine revving profile which may be implemented in the user controlled engine revving system.
Figure 3:
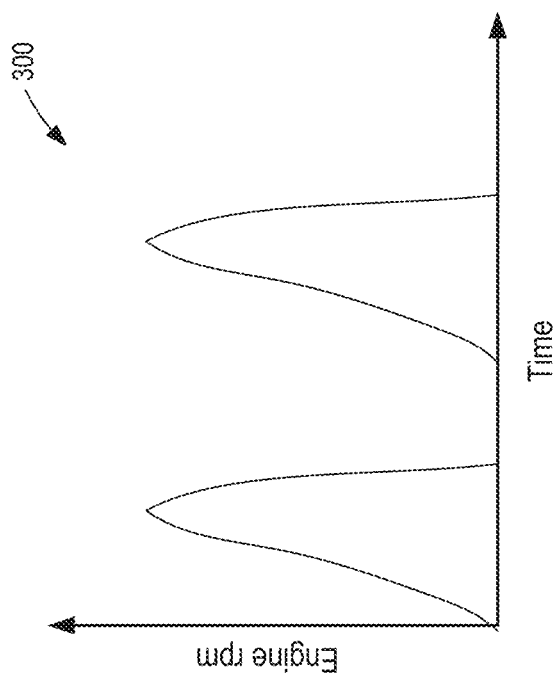
FIG. 3 shows a first example of an engine revving profile which may be implemented in the user controlled engine revving system.
Figure 5:
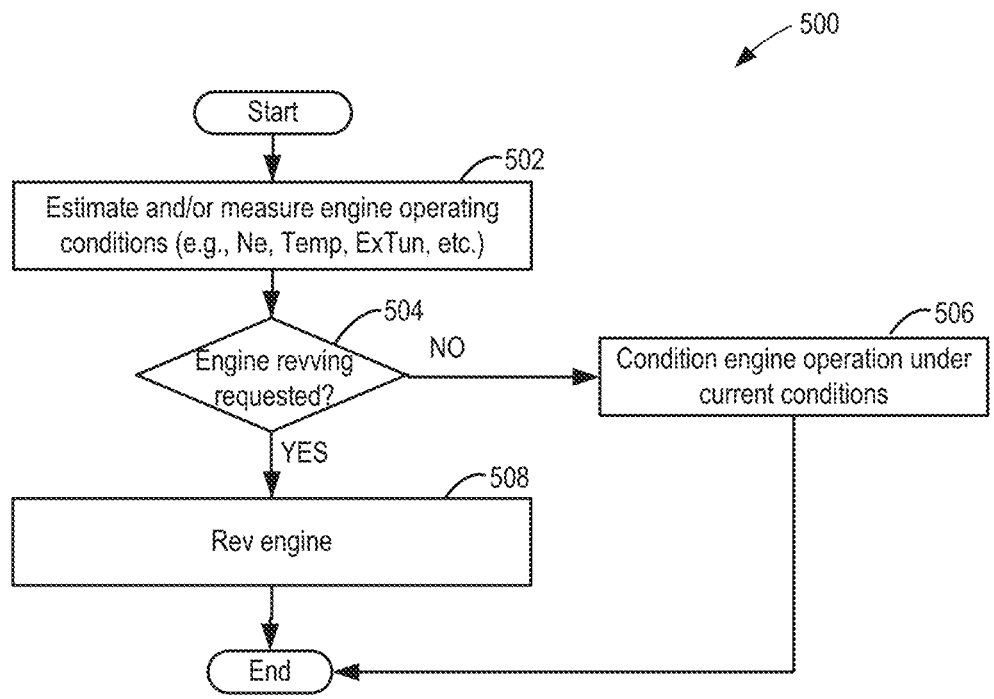
FIG. 5 shows a high level routine for activating engine revving.
Figure 6:
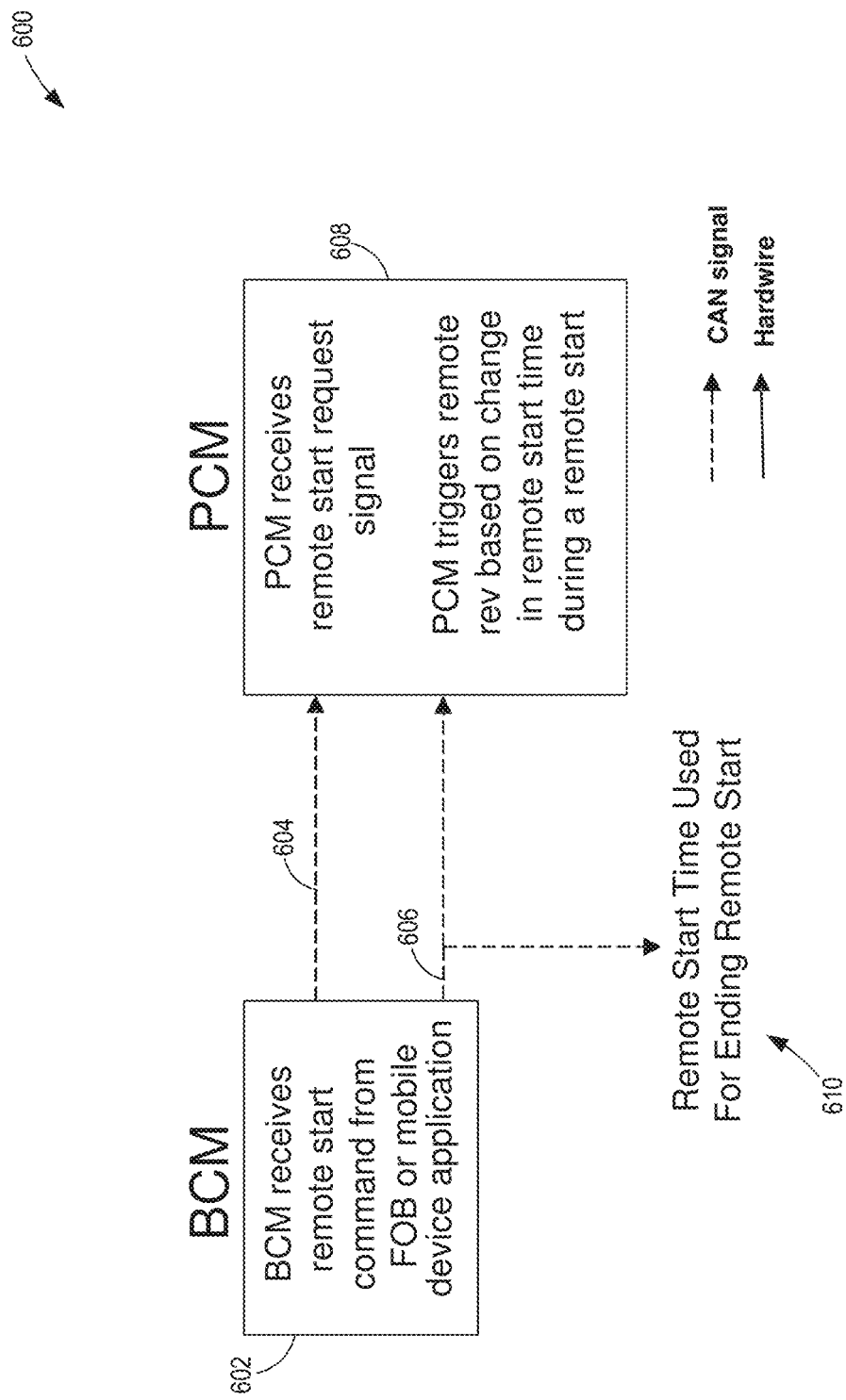
FIG. 6 is an example of a flow diagram depicting a signal transmission in a vehicle to remotely activate engine revving.
Figure 7:
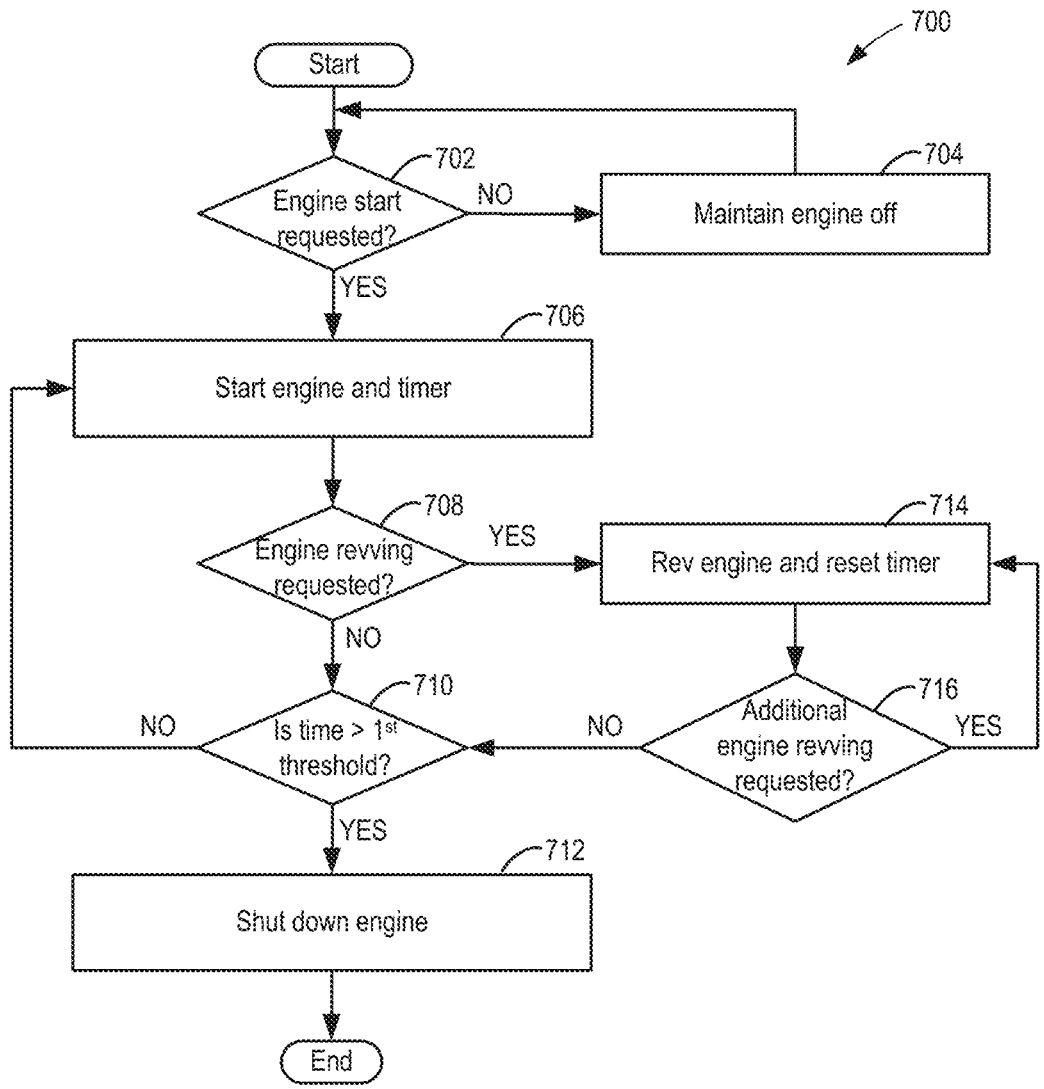
FIG. 7 shows an example of a routine for the user controlled engine revving system where the engine revving is linked to remote engine start.
Figure 8:
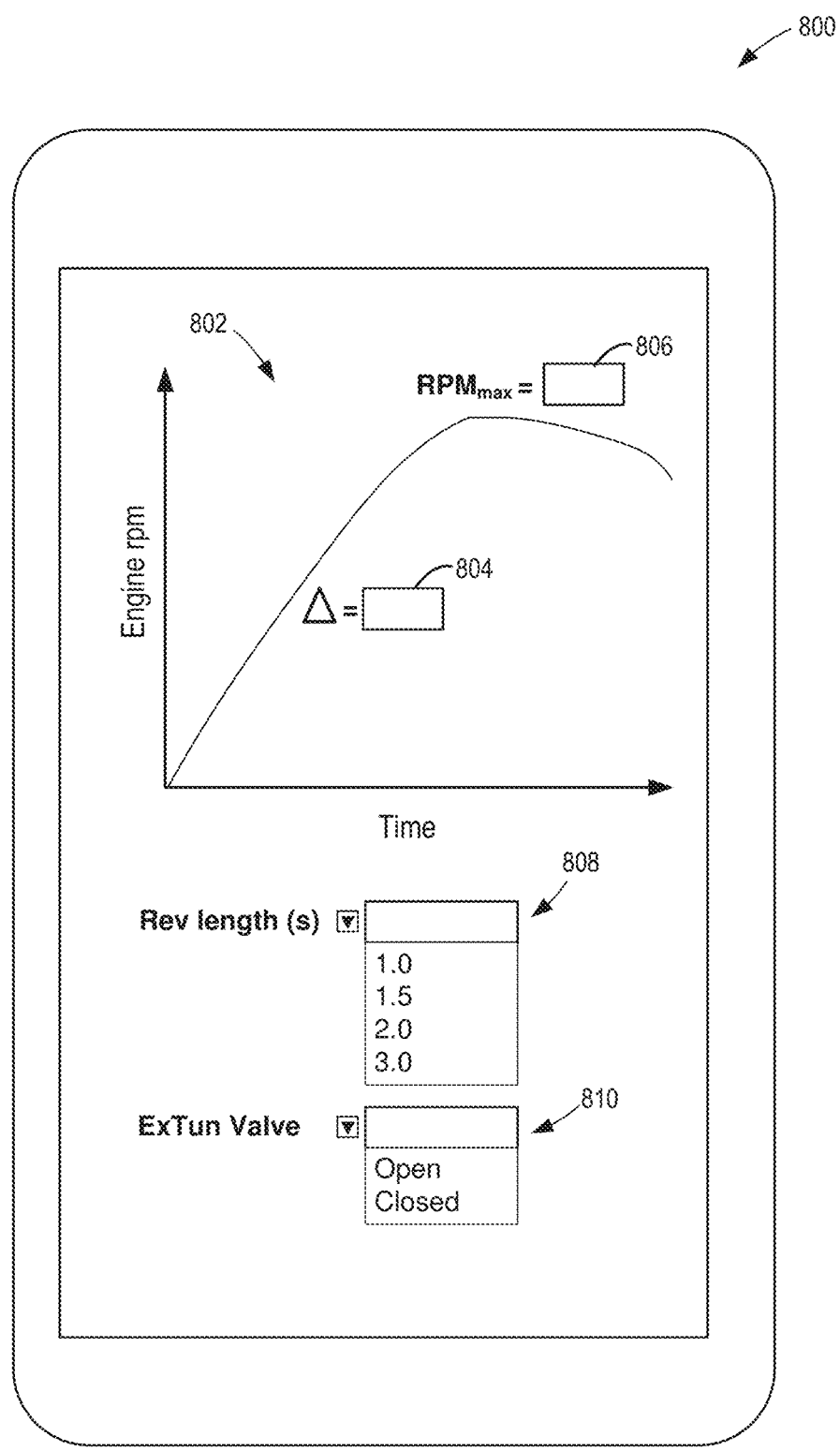
FIG. 8 shows an example of a user interface of an input device which may be used to control engine revving.

The following description relates to systems and methods for remote activation of an engine. An engine system, including the engine and an exhaust system, may generate a distinct sound when the engine is rotated at a peak rpm, e.g., engine revving. An example of the engine system is illustrated in FIG. 1. In one example, engine rotation may be controlled remotely and commanded to rotate at a speed higher than demanded by vehicle operation. A diagram representing control of engine rotation via a user controlled engine revving system utilizing an input device is depicted in FIG. 2. The user controlled engine revving system may include options such as customizable engine speed profiles, examples of which are depicted in FIGS. 3 and 4. An exemplary high level routine for activating engine revving by the user controlled engine revving system is shown in FIG. 5 and signal transmission between a powertrain control module (PCM) and a body control module (BCM) of a vehicle is illustrated in a flow diagram in FIG. 6. An example of a routine for controlling engine revving for a vehicle adapted with remote startup is shown in FIG. 7. In one example, the user controlled engine revving system may rely on the input device to input user-selectable parameters, as illustrated in FIG. 8 by an example of a user interface of the input device.

Turning now to the figures, FIG. 1 depicts an example of a cylinder 14 of an internal combustion engine 10, which may be included in a vehicle 5. Engine 10 may be controlled at least partially by a control system, including a controller 12, and by input from a vehicle user 130 via an input device 132. In this example, input device 132 includes an accelerator pedal and a pedal position sensor 134 for generating a proportional pedal position signal PP. Cylinder (herein, also "combustion chamber") 14 of engine 10 may include combustion chamber walls 136 with a piston 138 positioned therein. Piston 138 may be coupled to a crankshaft 140 so that reciprocating motion of the piston is translated into rotational motion of the crankshaft. Crankshaft 140 may be coupled to at least one vehicle wheel 55 via a transmission 54, as further described below. Further, a starter motor (not shown) may be coupled to crankshaft 140 via a flywheel to enable a starting operation of engine 10. In some examples, the starter motor may be remotely activated via an input device such as a key fob or a mobile device application, powered by a system battery 58.

In some examples, vehicle 5 may be a hybrid vehicle with multiple sources of torque available to one or more vehicle wheels 55. In other examples, vehicle 5 is a conventional vehicle with only an engine or an electric vehicle with only an electric machine(s). In the example shown, vehicle 5 includes engine 10 and an electric machine 52. Electric machine 52 may be a motor or a motor/generator. Crankshaft 140 of engine 10 and electric machine 52 are connected via transmission 54 to vehicle wheels 55 when one or more clutches 56 are engaged. In the depicted example, a first clutch 56 is provided between crankshaft 140 and electric machine 52, and a second clutch 56 is provided between electric machine 52 and transmission 54. Controller 12 may send a signal to an actuator of each clutch 56 to engage or disengage the clutch, so as to connect or disconnect crankshaft 140 from electric machine 52 and the components connected thereto, and/or connect or disconnect electric machine 52 from transmission 54 and the components connected thereto. Transmission 54 may be a gearbox, a planetary gear system, or another type of transmission.

The powertrain may be configured in various manners, including as a parallel, a series, or a series-parallel hybrid vehicle. In electric vehicle embodiments, the system battery 58 may be a traction battery that delivers electrical power to electric machine 52 to provide torque to vehicle wheels 55. In some embodiments, electric machine 52 may also be operated as a generator to provide electrical power to charge system battery 58, for example, during a braking operation. It will be appreciated that in other embodiments, including non-electric vehicle embodiments, system battery 58 may be a typical starting, lighting, ignition (SLI) battery coupled to an alternator 46.

Alternator 46 may be configured to charge system battery 58 using engine torque via crankshaft 140 during engine running. In addition, alternator 46 may power one or more electrical systems of the engine, such as one or more auxiliary systems including a heating, ventilation, and air conditioning (HVAC) system, vehicle lights, an on-board entertainment system, and other auxiliary systems based on their corresponding electrical demands. In one example, a current drawn on the alternator may continually vary based on each of a cabin cooling demand, a battery charging requirement, other auxiliary vehicle system demands, and motor torque. A voltage regulator may be coupled to alternator 46 in order to regulate the power output of the alternator based upon system usage requirements, including auxiliary system demands.

Cylinder 14 of engine 10 can receive intake air via a series of intake passages 142 and 144 and an intake manifold 146. Intake manifold 146 can communicate with other cylinders of engine in addition to cylinder 14. One or more of the intake passages may include one or more boosting devices, such as a turbocharger or a supercharger. For example, FIG. 1 shows engine 10 configured with a turbocharger, including a compressor 174 arranged between intake passages 142 and 144 and an exhaust turbine 176 arranged along an exhaust passage 135. Compressor 174 may be at least partially powered by exhaust turbine 176 via a shaft 180 when the boosting device is configured as a turbocharger. However, in other examples, such as when engine 10 is provided with a supercharger, compressor 174 may be powered by mechanical input from a motor or the engine and exhaust turbine 176 may be optionally omitted.

A throttle 162 including a throttle plate 164 may be provided in the engine intake passages for varying the flow rate and/or pressure of intake air provided to the engine cylinders. For example, throttle 162 may be positioned downstream of compressor 174, as shown in FIG. 1, or may be alternatively provided upstream of compressor 174. In some examples, vehicle 5 may be adapted with an Idle Speed Control (ISC) system which is communicatively coupled to an engine control unit (ECU) of vehicle 5 at controller 12. The ISC system may include a bypass 60 that routes at least a portion of air flowing through intake passage 144 around throttle 162 when throttle 162 is not an electronically controlled throttle body. The bypass 60 has an ISC valve 62 controlling an amount of air flowing through the bypass 60 where an opening of the ISC valve 62 is adjusted based on a signal from the ECU to regulate an idling speed of vehicle 5. By adjusting the opening of the ISC valve 62, an idle speed of vehicle 5 may be regulated.

An exhaust system 145 is coupled to cylinder 14 via a poppet valve 156. The exhaust system includes an exhaust manifold 148, an emission control device 178, an exhaust tuning valve 149, a muffler 151, and an exhaust tail pipe 147. The exhaust tuning valve is arranged in a bypass 153 which is parallel with the exhaust passage 135. In some examples a particulate filter (e.g., a gasoline particulate filter or diesel particulate filter) may be included in exhaust system 145 upstream or downstream of emission control device 178.

Exhaust manifold 148 can receive exhaust gases from other cylinders of engine 10 in addition to cylinder 14. An exhaust gas sensor 126 is shown coupled to exhaust manifold 148 upstream of an emission control device 178. Exhaust gas sensor 126 may be selected from among various suitable sensors for providing an indication of an exhaust gas air/fuel ratio (AFR), such as a linear oxygen sensor or UEGO (universal or wide-range exhaust gas oxygen), a two-state oxygen sensor or EGO, a HEGO (heated EGO), a NOx, a HC, or a CO sensor, for example. In the example of FIG. 1, exhaust gas sensor 126 is a UEGO. Emission control device 178 may be a three-way catalyst, a NOx trap, various other emission control devices, or combinations thereof. In the example of FIG. 1, emission control device 178 is a three-way catalyst.

The muffler 151 is positioned between emission control device 178 and the exhaust tail pipe 147. An amplitude of sound pressure generated by exhaust gases prior to exiting through the exhaust tail pipe 147 may be reduced by the muffler 151. For example, the exhaust gases may pass through one or more chambers or other sound-reducing structures within the muffler 151 before being released to the atmosphere. An amount of exhaust gas passing through the muffler 151 is controlled by the exhaust tuning valve 149. The exhaust tuning valve 149, when adjusted open, may divert at least a portion of the exhaust gases away from the muffler 151 and through the bypass 153 via the exhaust tuning valve 149. For example, when the exhaust tuning valve 149 is closed, the exhaust gases are flowed entirely through the muffler 151. However, when the exhaust tuning valve 149 is at least partially open, a portion of the exhaust gases flows through the opening of the exhaust tuning valve 149 while a remaining portion flows through the muffler 151 concurrently, where a size of the portion depends on an extent to which the exhaust tuning valve 149 is opened.

The opening of the exhaust tuning valve 149 may regulate engine exhaust noise. For example, an user may indicate a level of desired engine noise to controller 12 via an input, such as an in-vehicle dashboard control. As another example, user input may be indicated through use of a key fob or a mobile device application. When a higher level of exhaust noise is requested, controller 12 may increase the opening of the exhaust tuning valve 149. Conversely, when a lower level of exhaust noise is desired, controller 12 may decrease the opening of the exhaust tuning valve 149.

Each cylinder of engine 10 may include one or more intake valves and one or more exhaust valves. For example, cylinder 14 is shown including at least one intake poppet valve 150 and at least one exhaust poppet valve 156 located at an upper region of cylinder 14. In some examples, each cylinder of engine 10, including cylinder 14, may include at least two intake poppet valves and at least two exhaust poppet valves located at an upper region of the cylinder. Intake valve 150 may be controlled by controller 12 via an actuator 152. Similarly, exhaust valve 156 may be controlled by controller 12 via an actuator 154. The positions of intake valve 150 and exhaust valve 156 may be determined by respective valve position sensors (not shown).

During some conditions, controller 12 may vary the signals provided to actuators 152 and 154 to control the opening and closing of the respective intake and exhaust valves. The valve actuators may be of an electric valve actuation type, a cam actuation type, or a combination thereof. The intake and exhaust valve timing may be controlled concurrently, or any of a possibility of variable intake cam timing, variable exhaust cam timing, dual independent variable cam timing, or fixed cam timing may be used. Each cam actuation system may include one or more cams and may utilize one or more of cam profile switching (CPS), variable cam timing (VCT), variable valve timing (VVT), and/or variable valve lift (VVL) systems that may be operated by controller 12 to vary valve operation. For example, cylinder 14 may alternatively include an intake valve controlled via electric valve actuation and an exhaust valve controlled via cam actuation, including CPS and/or VCT. In other examples, the intake and exhaust valves may be controlled by a common valve actuator (or actuation system) or a variable valve timing actuator (or actuation system).

Cylinder 14 can have a compression ratio, which is a ratio of volumes when piston 138 is at bottom dead center (BDC) to top dead center (TDC). In one example, the compression ratio is in the range of 9:1 to 10:1. However, in some examples where different fuels are used, the compression ratio may be increased. This may happen, for example, when higher octane fuels or fuels with higher latent enthalpy of vaporization are used. The compression ratio may also be increased if direct injection is used due to its effect on engine knock.

Each cylinder of engine 10 may include a spark plug 192 for initiating combustion. An ignition system 190 can provide an ignition spark to combustion chamber 14 via spark plug 192 in response to a spark advance signal SA from controller 12, under select operating modes. A timing of signal SA may be adjusted based on engine operating conditions and driver torque demand. For example, spark may be provided at maximum brake torque (MBT) timing to maximize engine power and efficiency. Controller 12 may input engine operating conditions, including engine speed, engine load, and exhaust gas AFR, into a look-up table and output the corresponding MBT timing for the input engine operating conditions. In other examples, spark may be retarded from MBT, such as to expedite catalyst warm-up during engine start or to reduce an occurrence of engine knock.

In some examples, each cylinder of engine 10 may be configured with one or more fuel injectors for providing fuel thereto. As a non-limiting example, cylinder 14 is shown including a fuel injector 166. Fuel injector 166 may be configured to deliver fuel received from a fuel system 8. Fuel system 8 may include one or more fuel tanks, fuel pumps, and fuel rails. Fuel injector 166 is shown coupled directly to cylinder 14 for injecting fuel directly therein in proportion to a pulse width of a signal FPW received from controller 12 via an electronic driver 168. In this manner, fuel injector 166 provides what is known as direct injection (hereafter also referred to as "DI") of fuel into cylinder 14. While FIG. 1 shows fuel injector 166 positioned to one side of cylinder 14, fuel injector 166 may alternatively be located overhead of the piston, such as near the position of spark plug 192. Such a position may increase mixing and combustion when operating the engine with an alcohol-based fuel due to the lower volatility of some alcohol-based fuels. Alternatively, the injector may be located overhead and near the intake valve to increase mixing. Fuel may be delivered to fuel injector 166 from a fuel tank of fuel system 8 via a high pressure fuel pump and a fuel rail. Further, the fuel tank may have a pressure transducer providing a signal to controller 12.

In an alternate example, fuel injector 166 may be arranged in an intake passage rather than coupled directly to cylinder 14 in a configuration that provides what is known as port injection of fuel (hereafter also referred to as "PFI") into an intake port upstream of cylinder 14. In yet other examples, cylinder 14 may include multiple injectors, which may be configured as direct fuel injectors, port fuel injectors, or a combination thereof. As such, it should be appreciated that the fuel systems described herein should not be limited by the particular fuel injector configurations described herein by way of example.

Fuel injector 166 may be configured to receive different fuels from fuel system 8 in varying relative amounts as a fuel mixture and further configured to inject this fuel mixture directly into cylinder. Further, fuel may be delivered to cylinder 14 during different strokes of a single cycle of the cylinder. For example, directly injected fuel may be delivered at least partially during a previous exhaust stroke, during an intake stroke, and/or during a compression stroke. As such, for a single combustion event, one or multiple injections of fuel may be performed per cycle. The multiple injections may be performed during the compression stroke, intake stroke, or any appropriate combination thereof in what is referred to as split fuel injection.

Fuel tanks in fuel system 8 may hold fuels of different fuel types, such as fuels with different fuel qualities and different fuel compositions. The differences may include different alcohol content, different water content, different octane, different heats of vaporization, different fuel blends, and/or combinations thereof, etc.

Controller 12 is shown in FIG. 1 as a microcomputer, including a microprocessor unit 106, input/output ports 108, an electronic storage medium for executable programs (e.g., executable instructions) and calibration values shown as non-transitory read-only memory chip 110 in this particular example, random access memory 112, keep alive memory 114, and a data bus 70. In some examples, a powertrain control module (PCM) of vehicle 5 and a body control module (BCM) may be included in controller 12. The ECU and a transmission control unit may be integrated into the PCM and the BCM may be an electronic control unit responsible for monitoring and controlling various electronic accessories in vehicle 5. In one example, the data bus 70 may be a Controller Area Network (CAN) bus, local interconnect network (LIN) or other suitable data bus to facilitate data communication within vehicle 5. For example, the PCM may communicate with the BCM through the data bus 70. In addition, controller 12 may be operatively coupled to a remote control device 80 via the data bus 70. The remote control device 80 may be a device, such as a key fob or a mobile device configured with application software, to remotely control door locks, enable remote engine start, activate/deactivate an alarm system, etc., of vehicle 5. In other words, the remote control device 80 may be configured to control vehicle operations while positioned outside of and at a distance from vehicle 5.

Controller 12 may receive various signals from sensors coupled to engine 10, including signals previously discussed and additionally including a measurement of inducted mass air flow (MAF) from a mass air flow sensor 122; an engine coolant temperature (ECT) from a temperature sensor 116 coupled to a cooling sleeve 118; an exhaust gas temperature from a temperature sensor 158 coupled to exhaust passage 135; a profile ignition pickup signal (PIP) from a Hall effect sensor 120 (or other type) coupled to crankshaft 140; throttle position (TP) from a throttle position sensor; signal UEGO from exhaust gas sensor 126, which may be used by controller 12 to determine the AFR of the exhaust gas; and an absolute manifold pressure signal (MAP) from a MAP sensor 124. An engine speed signal, RPM, may be generated by controller 12 from signal PIP. The manifold pressure signal MAP from MAP sensor 124 may be used to provide an indication of vacuum or pressure in the intake manifold. Controller 12 may infer an engine temperature based on the engine coolant temperature and infer a temperature of emission control device 178 based on the signal received from temperature sensor 158.

Controller 12 receives signals from the various sensors of FIG. 1 and employs the various actuators of FIG. 1 to adjust engine operation based on the received signals and instructions stored on a memory of the controller. For example, controller 12 may receive a request for engine rotation at a target rpm from the remote control device 80. Upon receiving the request, controller 12 may command the opening of the ISC valve to be increased and/or increase an opening of the throttle to enhance air flow to the engine. Fuel injection may be adjusted according to the increase in air flow, thus causing engine speed to accelerate. Controller 12 may utilize the PIP signal from the Hall effect sensor to determine if engine is rotating at the desired speed and adjust the valve openings and fuel injection accordingly.

As described above, FIG. 1 shows only one cylinder of a multi-cylinder engine. As such, each cylinder may similarly include its own set of intake/exhaust valves, fuel injector(s), spark plug, etc. It will be appreciated that engine 10 may include any suitable number of cylinders, including 2, 3, 4, 5, 6, 8, 10, 12, or more cylinders. Further, each of these cylinders can include some or all of the various components described and depicted by FIG. 1 with reference to cylinder 14.

It may be desirable to selectively control operations of a vehicle for increased usability and entertainment value. For example, an ability to activate high frequency engine rotation, e.g., engine revving, while positioned outside of the vehicle may enhance the vehicle's appeal and marketability, particularly for performance vehicle enthusiasts. In one example, as shown in diagram 200 in FIG. 2, vehicle 5 of FIG. 1 is depicted as a performance vehicle, such as a sports car. Vehicle 5 may be configured to include a user controlled engine revving system which may utilize a BCM communicatively connected to a PCM through the data bus 70, which may be a CAN 70. The remote control device 80 provides a remote interface through which engine speed may be regulated while the remote control device 80 is not inside of vehicle 5.

In one example, such as when the remote control device 80 is a key fob, the remote control device 80 may be used to communicate with the BCM at a distance of up to 15 meters from vehicle 5. As another example, the remote control device 80 may be a mobile phone with an installed application configured to communicate wirelessly with the BCM through the CAN 70 from any distance. A user may input commands to be implemented by the PCM through a user interface at the mobile phone. The remote control device 80 may provide one-way communication or two-way communication as either the key fob or the mobile phone, as shown in FIG. 2, capable of sending and receiving signals via the CAN 70.

In another example, the commands may be directed to the PCM through user controls incorporated in, for example, a vehicle dashboard, instead of the remote control device 80. For example, the dashboard may include one or more buttons, switches, etc., which, when manipulated by the user, allows desired revving parameters to be communicated directly to the PCM. Alternatively, the dashboard may be adapted with a user interface, such as a touch screen, to allow instructions to be input by the user. In yet other examples, the vehicle may be configured to receive instructions from the user via both the remote control device 80 and the in-vehicle control.

A user may thus indicate a request for engine revving when the user is not seated in vehicle through the remote control device 80, e.g., by pressing/inputting a sequence through the button of the key fob, by utilizing commands provided by the application installed on the mobile phone, or by manipulating in-vehicle controls. In response to the request transmitted to the PCM from the BCM via the CAN 70 or directly to the PCM, the PCM may command an increase in engine rotational speed to a peak speed while the vehicle is not in gear, e.g., in a parked mode with the engine in an idling state.

In another example, the request may activate emission of a user selectable sound, as provided by an audio file stored on a memory of a vehicle controller, through a sound system of the vehicle. The user-selectable sound may include, for example, an engine revving sound, a turbine sound, or a flux capacitor sound. Already existing audio output devices, such as speakers and subwoofers located in various regions of the vehicle may be leveraged to play the engine revving sound. Virtual revving may be particularly desirable for all-electric vehicles but may be implemented in any type of vehicle. Furthermore, in some examples, variables such as a length of time that an engine is revved, a peak speed at which the engine is revved, an intensity of engine sound, a number of times the engine is revved per request, etc., may be controlled by the user.

As an example, when the key fob is used to activate engine revving, a button on the key fob may be pressed to request engine revving. A speed, a sound volume, and/or a duration of revving, as well as other variables, may be adjusted by pressing the button. For example, a number of times the button is pressed may control an engine revving variable, such as peak engine speed, and/or a sequence in which the button pressed may adjust another variable. Engine revving parameters may be similarly controlled by the in-vehicle control system, such as buttons, switches, etc., on the dashboard. Alternatively, when the mobile application or the dashboard user interface is used, the application may provide customizing capabilities. As an example, a first graph 300 is shown in FIG. 3 and a second graph 400 is shown in FIG. 4, the graphs plotting engine speed along the y-axis versus time along the x-axis.

In one example, the user may choose an engine speed profile option on the mobile application. The application may have a dropdown menu, for example, allowing the user to choose an engine revving variable from a list. The user may choose from a selection of engine speed profiles provided by the application or may generate a customized profile. For example, rapid bursts of engine revving, as shown in the first graph 300 of FIG. 3, may be chosen from the provided speed profiles or the user may trace a profile, e.g., draw the profile on the mobile phone user interface to generate the first graph 300. As another example, the second graph 400 of FIG. 4 may be another option selectable from the profiles provided by the mobile application or the user may delete the first graph 300 and draw the profile shown in the second graph 400 as a new engine speed profile to be implemented by the PCM.

Alternatively, when engine revving is activated by buttons, e.g., on a key fob or dashboard, desired parameter settings may be simplified and indicated based on a pattern in which a button is pressed. For example, pressing a first button once may cause the engine to be revved (or an engine revving sound to be played) once at a pre-set peak speed. Pressing the first button twice may cause the engine to be revved twice at the pre-set peak speed, pressing the first button three times may rev the engine three times, etc. In another example, depressing the first button for one second may rev the engine at a first speed, depressing the first button for two seconds may rev the engine at a second, faster speed, etc. As yet another example, button-activated revving control may include the first button for indicating a number of revving cycles and a second button for indicated a speed and/or volume of revving.

In another example, user controlled engine revving may be accompanied by activation of other vehicle components, such as vehicle lights. For example, during each revving cycle, taillights of the vehicle may be flashed, e.g., turned on, at an equivalent frequency as the revving cycles. Other vehicle lights, such as headlights, fog lights, etc., may additionally or alternatively be activated during revving. Illumination intensity may also be varied based on the engine revving command.

In yet another example, the engine revving pattern may be indicated based on input of music. For example, the user may enter musical notes in a desired sequence or load a song or melody via an audio file transmitted from the mobile application or dashboard user interface. Each musical note may be converted to a frequency sequence. The frequency sequence may be converted to an rpm sequence which may be adjusted faster or slower to center the rpm sequence about a target median rpm, such as 3000 rpm. The rpm sequence may be further moderated to fluctuate within a target rpm range, such as between 2000 to 5000 rpm, or an equivalent of one and one-half octaves range. Alternatively, a selection of a specific musical note may trigger playback of a number of engine revving cycles. For example, playing an E note may cause the engine to rev once, playing an F note may cause the engine to rev twice, and playing a G note may rev the engine three times.

As another example, when engine revving sound is played through the vehicle sound system, selection of a musical note or some other input method, such as a drop-down menu in a mobile application or dashboard user interface or a button depression sequence on a key fob or dashboard button, may vary a pitch and/or volume of the revving sound. Inputting a sequence of musical notes, e.g., a melody, may cause the sound system to play multiple engine revving cycles that simulates the sequence by adjusting a pitch and duration of each rev to reflect pitch and duration of each note of the sequence. Other vehicle accessories such as exterior lights, interior lights, etc., may flash in time with the revving pattern, in some examples.

Furthermore, in vehicles configured with hands-free telephony capability, engine revving may be activated by spoken command. For example, the vehicle may be adapted with microphones to detect specific words or phrases which may be converted to electrical signals and transmitted to the control system. The PCM may activate engine revving (or the vehicle sound system may play the engine revving sound) based on the spoken command. Alternatively, in some examples, the spoken command may be relayed to the control system through the mobile application. In such instances, the user may speak the command word or phrase into the mobile device which is sent to the PCM via the BCM and CAN.

In another example, as shown in FIG. 8, a user interface 800 of a remote control device, such as the remote control device 80 of FIGS. 1 and 2, or implemented in a vehicle dashboard, may include an engine revving profile 802, similar to the first graph 300 and the second graph 400 of FIGS. 3 and 4, respectively. In one example, as described above, a user may trace a desired profile for engine revving. Additionally or alternatively, the user interface 800 may include dialogue boxes and/or drop-down menus to allow the user to customize engine revving parameters. For example, the engine revving profile 802 may be displayed at the user interface 800 with one or more dialogue boxes corresponding to customizable parameters. For example, the user may enter a desired increase in engine rpm with time (e.g., a slope of the engine revving profile 802) at a first dialogue box 804, as well as a peak RPM and a hold duration of the peak, and further a rate of decease of RPM back to idle, as described herein. The user may provide a desired slope value that falls within a pre-set allowable range of values, e.g., if the user enters a value outside of the allowable, the value is not accepted and a notification is provided to the user to choose another value.

The engine revving profile 802 may also include a second dialogue box 806 at a top of the profile which may correspond to a selectable hold rpm, which may be a peak engine revving speed. The user may similarly enter a desired speed value which may be accepted as long as the value is equal to or below a pre-set maximum revving speed of the engine. The user interface 800 may further include selectable parameters with drop-in menus indicating allowable values for a respective parameter. For example, a first drop-down menu 808 is shown at the user interface 800 corresponding to values for a duration of engine revving at the peak speed, as entered at the second dialogue box 806. The user may select a value from a set of available values, e.g., 1.0 seconds, 1.5 seconds, etc. A second drop-down menu 810 may be provided for requesting a position of an exhaust tuning valve (e.g., open or closed). Upon selecting the position to be open, another drop-down menu may appear for selecting adjustment of an opening of the exhaust tuning valve, such as 50% open, 80% open, etc.

Various other parameters may be available for customization by the user, including a rate of engine deceleration to return to an idling speed, a number of engine revving repetitions, a sequence of repetitions, input of musical notes, songs or melodies, etc. It will be appreciated that the parameters shown in FIG. 8 are non-limiting examples of variables which may be adjusted during remote controlled engine revving. Moderation and implementation of other variables via the user interface 800 have been contemplated.

Certain engine conditions may be prioritized over the user-selected parameters in order to reduce a likelihood of engine degradation. For example, when the engine temperature is determined to be higher than a threshold temperature, an allowable peak engine speed may be lowered, or a number of revving repetitions may be reduced. At certain times of the day, e.g., during pre-set quiet hours, opening of the exhaust tuning valve may not be available or a maximum volume may be implemented in an all-electric vehicle configured to play engine revving sounds through a vehicle sound system. Other engine conditions determining allowable ranges/values of the user-selected parameters may include an engine oil temperature, an engine oil level, a fuel level, and any other engine conditions where engine revving may lead to degradation of engine components when the conditions are not optimal.

A high level routine 500 for activating engine revving in a vehicle adapted with a user controlled engine revving system is shown in FIG. 5. An engine of the vehicle may be already on and rotating while the vehicle is stationary, e.g., idling and with a key inserted in an ignition of the vehicle. Alternatively, when the vehicle is an electric vehicle, the vehicle may be activated and on stand-by. The vehicle is adapted with a control unit including a PCM, a BCM, and a CAN through which the PCM and BCM communicate. The BCM is configured to receive signals from a remote device, such as a key fob or a mobile device, which may be controlled by a user with the remote device positioned outside of the vehicle and relay the signals to the PCM. Additionally or alternatively, the vehicle may have in-vehicle controls for activating and controlling engine revving which may be sent directly to the PCM. Instructions for carrying out routine 500 and the rest of the methods included herein may be executed by the PCM based on instructions stored on a memory of the PCM and in conjunction with signals received from sensors of the engine system, such as the sensors described above with reference to FIG. 1. The PCM may employ engine actuators of the engine system to adjust engine operation, according to the methods de scribed below.

At 502, the routine includes estimating current engine operating conditions. For example, engine speed may be measured by a Hall effect sensor, such as the Hall effect sensor 120 of FIG. 1, an engine temperature may be detected by a temperature sensor at an intake manifold or combustion chamber of the engine, a position of an exhaust tuning valve, such as the exhaust tuning valve 149 of FIG. 1, may be confirmed, etc.

The routine includes determining if a request for engine revving is received at 504. The request may be initiated at the remote device by user input, such as pressing a button on a key fob or inputting the request in a mobile device application, and sent wirelessly from the remote device to the PCM. Furthermore, the request may be indicated based on user manipulation of an in-vehicle control, such as a dashboard button or dashboard user interface. Various alternative methods for inputting/indicating the request for engine revving are possible, as described above. In some examples, the signal may be routed to the PCM through the BCM by way of the CAN. If the request is not received by the PCM, the routine continues to 506 continue engine operation under the current conditions. The routine ends.

However, if the request is received by the PCM, the routine proceeds to 508 to execute revving of the engine. The engine may be revved at a pre-set peak speed and a pre-set sequence corresponding to a specific request configuration. For example, if the remote device is the key fob, pressing the button on the key fob twice may trigger engine revving at 3000 rpm for 1 second while pressing the button three times may facilitate engine revving at 4000 rpm for 1 second or engine revving at 3000 rpm for 2 seconds. Additionally, a sequence in which the button is pressed may adjust an opening of the exhaust tuning valve. Various engine revving profiles and various initiation sequences at the remote device or in-vehicle controls (e.g., button(s), switches and/or user interface at the vehicle dashboard) are possible. A single command received from an input mechanism may trigger a single engine revving cycle, multiple engine revving cycles following a specific sequence, different revving pitch and volume (within a target rpm range, such as 2000-5000 rpm), as well as activation of other vehicle accessories, such as vehicle lights.

Alternatively, if the remote device is a mobile device with a suitable application for communicating with the BCM/PCM or the dashboard user interface, the user may, in one example, provide a customized engine speed profile, such as the profiles shown in FIGS. 3 and 4, and the profile may be executed as commanded by the PCM. To rev the engine, a throttle, e.g., the throttle 162 of FIG. 1, may be instructed to increase its opening to allow more air to flow to the engine intake. Concurrently the PCM may command adjustment of the opening of the exhaust tuning valve. For example, the opening may be increased as engine rpm is accelerated to increase an amount of exhaust gas bypassing a muffler to increase volume of sound emitted from an exhaust tail pipe of the vehicle. Increasing air flow to the engine intake may increase fuel injection at the engine cylinders to maintain stoichiometry, thus increasing generation of exhaust gases and further enhancing audible engine revving in conjunction with adjustment of the exhaust tuning valve.

In instances where the vehicle is a hybrid-electric vehicle, a motor (e.g., electric machine 52 of FIG. 1) driving rotation of a crankshaft may be energized by an energy storage device (such as the battery 58 of FIG. 1) to accelerate crankshaft speed. An opening of a throttle may be increased as the crankshaft speed is increased. Upon completing the desired engine revving, the engine speed may be returned to a speed of rotation prior to revving, e.g., returned to the idling mode, and the exhaust tuning valve opening may be similarly returned to a previous settings suitable for engine idling.

Alternatively, when the vehicle does not have an engine, e.g., the vehicle is electric, the control system may receive the request for engine revving by any of the methods described above. A sound system of the vehicle, including audio output devices such as speakers and/or subwoofers arranged in various regions of the vehicle, may be commanded to access audio files stored in the memory of the controller. Opening the audio files may allow engine revving sounds to be played through the sound system, according to a specific input pattern or sequence.

As described above, user controlled engine revving may be achieved via a variety of input and playback methods. Upon responding to the request for engine revving, the routine ends.

In some instances, user controlled engine revving may be linked to remote controlled engine startup. As such, engine revving may not be enabled unless specific criteria are met. For example, engine revving may be activated only after remote engine startup is implemented and the vehicle is determined to be in a suitable location that is not in an enclosed area. The location of the vehicle may be detected by a GPS system of the vehicle, as one example. Control logic for engine revving may be incorporated into an algorithm for remote engine startup. An example of signal transmission for remote engine startup and engine revving is illustrated in FIG. 6 in a flow diagram 600.

A remote, e.g., external to a vehicle, request for engine startup may be sent to a BCM via a key fob or a mobile device application, as described above. Upon receiving the request, the BCM may relay more than one signal to the PCM, as illustrated in the flow diagram 600. For example, the BCM may receive a remote start command from the remote control device, as shown at 602. The command may be sent as a radiofrequency (RF) signals or may be routed through a telematics control unit (TCU). The signals may include a first signal 604 and a second signal 606.

The first signal 604 may be a request for engine startup directed to the PCM at 608. In other words, the request for engine startup is input at a device, such as the remote control device 80 of FIGS. 1 and 2, that is positioned remote relative to a vehicle. The request is received by the BCM which relays a corresponding signal to the PCM. In response to receiving the remote start request signal, the PCM may command acceleration of engine speed, as described above with reference to FIG. 5.

The second signal 606 may be a signal indicating a time stamp for engine startup which is used at 610 by an ISC system to initiate a timer, in some examples, where the ISC system is monitored by an ECU included in the PCM. After a pre-set period of time elapses, such as, for example, 15 minutes, the engine may be commanded to shutdown, e.g., rotation is terminated, by the PCM. The command for engine shutdown may be dependent on detection of passengers entering the vehicle. For example, if a vehicle door is opened and/or closed or a weight from a passenger is detected at a vehicle seat before the period of time elapses, the engine does not turn off. However, if no activity is detected within the pre-set period of time, the engine is shutdown when the timer runs out.

The second signal 606 may also include a request for remotely activated engine revving. The request for engine revving may be indicated, for example, based on a number of times a button on a key fob is pressed or input from a mobile device application, as described above. Upon receiving the second signal 606 with the engine revving request, the PCM may command engine revving by, for example, adjusting openings of an ISC valve, a throttle, and an exhaust tuning valve. The timer, activated at engine startup, may be reset upon receiving the engine revving request, thus extending the duration of time before engine shutdown is commanded if the activity is not detected.

In some examples, the second signal 606 may also include a pattern of the engine revving request, when input at the key fob, or a target engine speed profile when input at the mobile device application. The pattern or profile may determine an acceleration of engine speed, a duration of the acceleration, a sound volume of the revving, etc. Adjustment of actuators to implement the engine revving according to the pattern or profile may be instructed by the PCM.

The remote controlled engine revving routine 500 of FIG. 5 and transmission of signals shown in FIG. 6 may be implemented, in one example, in a vehicle with an automatic transmission. Control logic for facilitating engine revving may be added to already existing algorithms stored in the vehicle's controller for remote engine start. In some instances, however, the vehicle may instead have a manual transmission. As such, criteria for enabling remote controlled engine revving may include revving the engine as requested when the engine is already running, the vehicle transmission is in neutral and/or a parking brake is activated. A vehicle mode for engine revving may be selectable, e.g., a button or switch on a vehicle control panel, to adjust the vehicle to a mode configured to rev the engine as requested.

A routine 700 for activating engine revving in a vehicle via a user controlled engine revving system is depicted in FIG. 7. The vehicle may be the vehicle 5 of FIGS. 1 and 2, adapted with an automatic transmission and configured with remote engine startup actuated by a remote control device, such as the remote control device 80 of FIGS. 1 and 2. The vehicle has a control unit including a PCM with an ECU monitoring an ISC system of the vehicle, a BCM, and a CAN through which the PCM and BCM communicate. The BCM is configured to receive signals from the remote control device which may be controlled by a user outside of the vehicle and relay the signals to the PCM. Instructions for carrying out routine 700 and the rest of the methods included herein may be executed by the PCM based on instructions stored on a memory of the PCM and in conjunction with signals received from sensors of the engine system, such as the sensors described above with reference to FIG. 1. The PCM may employ engine actuators of the engine system to adjust engine operation, according to the methods described below.

At 702, the routine includes determining if a request for remote engine startup is received at the PCM. The request may be input at the key fob or mobile device and sent to the BCM. The BCM may route the request signal to the PCM through the CAN. If no request for engine startup is received by the PCM, the routine continues to 704 to maintain the engine off. The routine returns to the start.

If the request for engine startup is received by the PCM, the PCM may command a sequence of operations to be implemented to start the engine 706. However, the engine may be started only if certain criteria are met. For example, the engine is started if a parking brake is engaged, as determined by a position sensor, the vehicle is not in gear, as determined by a transmission control unit, and/or the vehicle is confirmed to not be in an enclosed space. Confirmation that the vehicle is not in an enclosed space may be provided by a vehicle GPS system or by a question prompt on the mobile device application.

The sequence of operations performed during engine startup may include activation of a starter motor to drive rotation of a crankshaft, flowing air to an intake manifold of the engine, injecting and combusting fuel at engine cylinders, adjustment of an ISC valve opening as well as a throttle, amongst others. When engine startup is complete, various actuators may be adjusted according to an idling state of the engine. The routine, at 706, also includes relaying a time stamp to the ISC system, e.g., to the ECU, corresponding to when the engine is started. A timer is initiated and monitored by the ISC system.

At 708, the routine includes determining if a remote request for engine revving is indicated. The request may be initiated at the remote control device by user input and sent wirelessly from the remote control device to the PCM via the BCM and CAN. Alternatively, the request may be indicated by any of the methods described previously, e.g., via the remote control device, in-vehicle controls, voice activation, etc. If the request is not received by the PCM, the routine continues to 710 to compare an elapsed period of time according to the timer to a first threshold. The first threshold may be a duration of time after which the engine may be turned off if no user activity is detected. As an example, if no change in vehicle door position occurs within the first threshold, e.g., no doors are opened after engine startup with all the vehicle doors closed or a door is not closed after engine startup with at least one door open, the engine is shutdown. Alternatively, if no occupancy at the driver's seat is detected within the first threshold, the engine may similarly be shut down. By shutting down the engine after a period of time passes with no activity or input from an user, prolonged engine operation and release of emissions is circumvented.

If the elapsed time does not exceed the first threshold, the routine returns to 706 to continue monitoring the timer with the engine on. If the elapsed time exceeds the first threshold, the routine proceeds to 712 to turn off the engine. For example, air flow to the intake manifold may be ceased, fuel injection may be terminated, etc. The routine ends.

Returning to 708, if the remote request for engine revving is detected, the routine continues to 714 to accelerate engine speed. In addition, the timer may be reset and restarted when the request is received. The engine may be revved as described above with reference to FIG. 5. Concurrently the PCM may command adjustment of the opening of the exhaust tuning valve. For example, the opening may be increased as engine rpm is accelerated to increase an amount of exhaust gas bypassing a muffler to increase volume of sound emitted from an exhaust tail pipe of the vehicle. Fuel injection at the engine combustion chambers may be adjusted accordingly.

The revving of the engine may follow a pre-set target speed and duration or an engine speed profile, for example. For example, the engine may be revved according to a profile such as the profiles shown in FIGS. 3 and 4. As another example, the key fob button may be activated again, e.g., after first pressing the button to initiate engine startup. Activating the button a second time, after engine startup is complete, may indicate engine revving is desired. Furthermore, in one example, activating the button may include pressing the button more than once in a quick burst and a sequence in which the button is pressed may provide information about a target speed. For example, depressing the button once (after pressing the button to activate engine startup) may load an engine revving target rpm of 2000 with the exhaust tuning valve closed. Depressing the button twice rapidly may load a higher target of 3000 rpm with the exhaust tuning valve open. Depressing the button three times quickly may load a target rpm of 4000 with the exhaust tuning valve open. Each request may activate engine revving and exhaust tuning valve opening for a set period of time, such as 1 second and three seconds, respectively. In other words, a number of button depressions may be monitored and matched with a corresponding set of parameters. As such, increasing a number of times the button is pressed relative to a previous request may increase the target revving rpm and noise level while decreasing the number of depressions relative to a previous request may decrease revving rpm and noise level. Various other sequences and patterns for indicating a desired engine revving configuration may be implemented as alternative, as described above.

Engine revving may be maintained for a pre-set duration of time, such as 1.5 seconds. After the pre-set engine revving duration elapses, engine speed, throttle position, and exhaust tuning valve position may be returned to settings suitable for engine idling. For example, the engine may rotate at 600 rpm, the throttle opening adjusted, and the exhaust tune valve may be closed to maintain engine idle.

It will be appreciated that the sequence of button depressions implemented at the key fob described above is a non-limiting example. Other examples may include variations in button depression sequences to request specific target engine speeds and/or sound volume, or other remote control devices with different methods to request engine revving. For example, the mobile phone application may instead be used which may include a variety of selectable and adjustable menu options.

In addition, the PCM memory may also store instructions to cap the engine rpm and revving sound volume at certain periods during the day. For example, during designated quiet hours, such as 10 μm to 7 am, a maximum engine rpm may be set at 2000 and the exhaust tuning valve maintained closed regardless of requested engine revving. In other words, engine speed may be constrained to a pre-set rpm and exhaust noise may be similarly constrained to a pre-set volume.

At 716, the routine includes determining if an additional request for engine revving is requested. The additional request may be a repetition of the request received at 708 or may be a request for a different revving rpm, sequence of revving cycles, revving pitch, noise volume, etc. As described above, the additional request may be one of a sequence of button depressions at the key fob or a selected menu item from the mobile phone application. If the additional request is received, the routine returns to 714 to rev the engine as requested and the timer is reset and restarted. If the additional request is not received, the routine returns to 710 to determine whether the time elapsed since restarting the timer at 714 surpasses the first threshold.

In this way, engine revving may be activated remotely, e.g., by a user employing a remote device positioned outside of and at a distance from a vehicle using an already existing architecture of the engine. Alternatively or additionally, user controlled engine revving may also be enabled by in-vehicle controls, such as controls at a dashboard or some other region of the vehicle cabin. Furthermore, virtual engine revving is enabled by emitting revving sounds through a sound system of the vehicle. Incorporation of additional components is thereby precluded. User controlled engine revving may be enabled at low cost by implementing instructions at a vehicle controller for adjusting engine speed and revving sound intensity in response to a user-initiated request for engine revving.

The technical effect of implementing user-initiated engine revving is that engine speed and a volume of sound emanating from an exhaust tail pipe of a vehicle may be increased without requiring manual depression of an accelerator pedal.

The disclosure also provides support for a method comprising, in response to a user-initiated command, revving an engine of a vehicle to a peak speed, according to a target revving sequence, in response to an input device operated by the user, wherein the revving is enabled without manual depression of an accelerator pedal. In a first example of the method, revving the engine in response to the user-initiated command includes sending the user-initiated command from the input device when the input device is positioned outside of and at a distance from the vehicle or within a cabin of the vehicle. In a second example of the method, optionally including the first example, the method further comprises: transmitting a request for one or more of the peak speed, and the target revving sequence, the target revving sequence including a number of engine revving cycles, a duration of engine revving, and a revving volume, based on a pattern in which the user inputs the request at the input device. In a third example of the method, optionally including the first and second examples, revving the engine in response to the user-initiated command includes receiving the user-initiated command at a body control module (BCM) of the vehicle and relaying the user-initiated command from the BCM to a powertrain control module (PCM) of the vehicle and wherein relaying the user-initiated command from the BCM to the PCM includes sending a signal based on the user-initiated command to the PCM from the BCM through a controller area network (CAN). In a fourth example of the method, optionally including the first through third examples, the method further comprises: adjusting an opening of an exhaust tuning valve arranged in an exhaust tail pipe, the exhaust tuning valve configured to divert exhaust gas around a muffler, of the vehicle based on the user-initiated command. In a fifth example of the method, optionally including the first through fourth examples, the user-initiated command includes one or more musical notes and/or a melody indicated at the input device and wherein the engine is revved according to a conversion of the one or more musical notes and/or melody to engine speed. In a sixth example of the method, optionally including the first through fifth examples, vehicle lights are flashed when the engine is revving and wherein the vehicle lights are flashed according to the target revving sequence. In a seventh example of the method, optionally including the first through sixth examples, the user-initiated command is a spoken command detected by a microphone in one of the input device or a cabin of the vehicle.

The disclosure also provides support for a method for a vehicle, comprising, upon receiving a first request from an input device, starting an engine of the vehicle and operating the engine in an idling mode, and upon receiving a second request, subsequent to the first request, from the input device, revving the engine to a peak speed according to a revving sequence, where the peak speed and revving sequence are adjusted responsive to user input at the input device, and adjusting a position of an exhaust tuning valve based on the peak speed and a target volume of sound emitted from a tail pipe of the vehicle. In a first example of the method, the method further comprises: starting a timer upon receiving the first request and wherein the engine is shut down when the timer runs out without detected activity at the vehicle. In a second example of the method, optionally including the first example, the method further comprises: resetting the timer upon receiving the second request. In a third example of the method, optionally including the first and second examples, the method further comprises: receiving additional requests subsequent to the second request, wherein the timer is reset with each additional request. In a fourth example of the method, optionally including the first through third examples, receiving the second request and the additional requests includes determining the peak speed and revving sequence for each request based on a pattern of button depression when the input device has a button. In a fifth example of the method, optionally including the first through fourth examples, receiving the second request and the additional requests includes determining the peak speed and revving sequence for each request based on parameters selected at a user interface of the input device. In a sixth example of the method, optionally including the first through fifth examples, the method further comprises: constraining the peak speed and the volume of sound to a pre-set speed and volume during designated quiet hours. In a seventh example of the method, optionally including the first through sixth examples, starting the engine upon receiving the first request includes confirming that the vehicle is not in an enclosed space and wherein the engine is not started when the vehicle is in an enclosed space.

The disclosure also provides support for a vehicle, comprising, a sound system configured to emit user-selected sounds through audio output devices of the vehicle, and a controller with executable instructions stored on non-transitory memory to upon receiving a user-initiated signal, play one of the user-selected sounds at a target volume, frequency, and sequence based on the user-initiated signal. In a first example of the system, the vehicle is an electric vehicle and the audio output devices includes speakers and subwoofers located in various regions of the electric vehicle. In a second example of the system, optionally including the first example, the user-initiated signal is input at one or more of a key fob, a mobile device, an in-vehicle control mechanism, and a hands-free telephony capability of the vehicle. In a third example of the system, optionally including the first and second examples, the input of the user-initiated signal includes one or more of depression of a button, selection of engine revving parameters at a user interface, and a spoken command.

In another representation, a method includes accelerating an engine of a vehicle while the vehicle is in a parked mode via a device positioned at a distance from the vehicle, wherein the device is communicatively coupled to the vehicle's controller. In a first example of the method, accelerating the engine includes energizing a motor to increase rotation of a crankshaft. A second example of the method optionally includes the first example, and further includes increasing openings of an exhaust tuning valve and an idle control valve while accelerating the engine. A third example of the method optionally includes one or more of the first and second examples, and further includes, wherein the engine is started via the device prior to accelerating the engine. A fourth example of the method optionally includes one or more of the first through third examples, and further includes, wherein the engine is accelerating to a selected peak speed and subsequent to reaching the peak speed, the engine is adjusted to an idling mode. A fifth example of the method optionally includes one or more of the first through fourth examples, and further includes, decreasing the openings of the exhaust tuning valve and the idle control valve when the engine is adjusted to the idling mode.

In yet another representation, a method for revving an engine based on an input received without depression of an accelerator pedal, the revving including automatically increasing engine speed and then decreasing engine speed at zero vehicle speed. In a first example of the method, the revving may be triggered by a remote request from remote of the vehicle, and/or within the vehicle, via a mobile device or fob. A second example of the method optionally includes the first example, and further includes wherein a profile of the revving may be received by a vehicle controller and/or stored within the vehicle controller.

Note that the example control and estimation routines included herein can be used with various engine and/or vehicle system configurations. The control methods and routines disclosed herein may be stored as executable instructions in non-transitory memory and may be carried out by the control system including the controller in combination with the various sensors, actuators, and other engine hardware. The specific routines described herein may represent one or more of any number of processing strategies such as event-driven, interrupt-driven, multi-tasking, multi-threading, and the like. As such, various actions, operations, and/or functions illustrated may be performed in the sequence illustrated, in parallel, or in some cases omitted. Likewise, the order of processing is not necessarily required to achieve the features and advantages of the example embodiments described herein, but is provided for ease of illustration and description. One or more of the illustrated actions, operations and/or functions may be repeatedly performed depending on the particular strategy being used. Further, the described actions, operations and/or functions may graphically represent code to be programmed into non-transitory memory of the computer readable storage medium in the engine control system, where the described actions are carried out by executing the instructions in a system including the various engine hardware components in combination with the electronic controller.

It will be appreciated that the configurations and routines disclosed herein are exemplary in nature, and that these specific embodiments are not to be considered in a limiting sense, because numerous variations are possible. For example, the above technology can be applied to V-6, I-4, I-6, V-12, opposed 4, and other engine types. The subject matter of the present disclosure includes all novel and non-obvious combinations and sub-combinations of the various systems and configurations, and other features, functions, and/or properties disclosed herein.

The following claims particularly point out certain combinations and sub-combinations regarded as novel and non-obvious. These claims may refer to "an" element or "a first" element or the equivalent thereof. Such claims should be understood to include incorporation of one or more such elements, neither requiring nor excluding two or more such elements. Other combinations and sub-combinations of the disclosed features, functions, elements, and/or properties may be claimed through amendment of the present claims or through presentation of new claims in this or a related application. Such claims, whether broader, narrower, equal, or different in scope to the original claims, also are regarded as included within the subject matter of the present disclosure.

The invention claimed is:

1. A method for a vehicle, comprising:
   upon receiving a first request from an input device, starting an engine of the vehicle and operating the engine in an idling mode; and
   upon receiving a second request, subsequent to the first request, from the input device,
   revving the engine to a peak speed according to a revving sequence, where the peak speed and the revving sequence are adjusted responsive to user input at the input device; and
   adjusting a position of an exhaust tuning valve based on the peak speed and a target volume of sound emitted from a tail pipe of the vehicle.

2. The method of claim 1, further comprising starting a timer upon receiving the first request and wherein the engine is shut down when the timer runs out without detected activity at the vehicle.

3. The method of claim 2, further comprising resetting the timer upon receiving the second request.

4. The method of claim 3, further comprising receiving additional requests subsequent to the second request, wherein the timer is reset with each additional request.

5. The method of claim 4, wherein receiving the second request and the additional requests includes determining the peak speed and the revving sequence for each request based on a pattern of button depression when the input device has a button.

6. The method of claim 4, wherein receiving the second request and the additional requests includes determining the peak speed and the revving sequence for each request based on parameters selected at a user interface of the input device.

7. The method of claim 1, further comprising constraining the peak speed and the target volume of sound to a pre-set speed and volume during designated quiet hours.

8. The method of claim 1, wherein starting the engine upon receiving the first request includes confirming that the vehicle is not in an enclosed space and wherein the engine is not started when the vehicle is in an enclosed space.

* * * * *